US011722768B2

(12) United States Patent
Huang et al.

(10) Patent No.: US 11,722,768 B2
(45) Date of Patent: Aug. 8, 2023

(54) METHOD AND APPARATUS FOR CONTROLLING CAMERA, AND MEDIUM AND ELECTRONIC DEVICE

(71) Applicant: Beijing Ambow Shengying Education and Technology Co., Ltd., Beijing (CN)

(72) Inventors: Jin Huang, Beijing (CN); Gang Huang, Beijing (CN); Kesheng Wang, Beijing (CN); Yin Yao, Beijing (CN); Qiaoling Xu, Beijing (CN)

(73) Assignee: BEIJING AMBOW SHENGYING EDUCATION AND TECHNOLOGY CO., LTD., Beijing (CN)

( * ) Notice: Subject to any disclaimer, the term of this patent is extended or adjusted under 35 U.S.C. 154(b) by 84 days.

(21) Appl. No.: 17/388,077

(22) Filed: Jul. 29, 2021

(65) Prior Publication Data
US 2022/0337738 A1 Oct. 20, 2022

(30) Foreign Application Priority Data

Apr. 20, 2021 (CN) .......................... 202110423610.2

(51) Int. Cl.
*H04N 23/67* (2023.01)
*H04N 21/2187* (2011.01)
(Continued)

(52) U.S. Cl.
CPC ............. *H04N 23/67* (2023.01); *G06V 40/18* (2022.01); *H04N 21/2187* (2013.01); *H04N 21/23418* (2013.01)

(58) Field of Classification Search
CPC ........... H04N 5/23212; H04N 21/2187; H04N 21/23418; H04N 5/23219; H04N 21/44218; G06V 40/18; G09B 5/00
See application file for complete search history.

(56) References Cited

U.S. PATENT DOCUMENTS 11,120,640 B1\* 9/2021 Yang ....................... G06F 3/013
2013/0314421 A1\* 11/2013 Kim ........................ G06T 19/00
345/427
(Continued)

FOREIGN PATENT DOCUMENTS

CN 104735416 A 6/2015
CN 110555331 A 12/2019
(Continued)

OTHER PUBLICATIONS

Office Action dated May 11, 2022, in corresponding Chinese patent Application No. 202110423610.2, 15 pages.
(Continued)

*Primary Examiner* — Shahbaz Nazrul
(74) *Attorney, Agent, or Firm* — Xsensus LLP

(57) ABSTRACT

A method and an apparatus for controlling a camera, and a medium and an electronic device are disclosed. The method includes: acquiring head portrait information of a teacher in a video frame image of a live classroom in real time; analyzing the head portrait information to acquire organ identification information of each organ, wherein the organ identification information is used to indicate whether the organ exists; determining an orientation type of a face in the head portrait information based on the organ identification information, wherein the orientation type comprises a forward type, a lateral type, and a backward type; controlling the camera to focus on the teacher in response to the orientation type being the forward type; and controlling the camera to focus on a blackboard in response to the orientation type being the backward type or the lateral type.

10 Claims, 9 Drawing Sheets

(51) Int. Cl.
*H04N 21/234* (2011.01)
*G06V 40/18* (2022.01)

(56) References Cited

U.S. PATENT DOCUMENTS

| | | | | |
|---|---|---|---|---|
| 2015/0044657 | A1* | 2/2015 | Dalal | G09B 5/02 |
| | | | | 434/350 |
| 2019/0289198 | A1* | 9/2019 | Bosworth | H04N 5/23219 |
| 2022/0198774 | A1* | 6/2022 | Wang | G06V 40/20 |
| 2022/0337755 | A1* | 10/2022 | Huang | G06T 7/13 |

FOREIGN PATENT DOCUMENTS

| | | |
|---|---|---|
| CN | 111144356 A | 5/2020 |
| CN | 111182250 A | 5/2020 |

OTHER PUBLICATIONS

Office Action dated Feb. 11, 2022, in corresponding Taiwanese patent Application No. 110127253, 8 pages.

\* cited by examiner

METHOD AND APPARATUS FOR CONTROLLING CAMERA, AND MEDIUM AND ELECTRONIC DEVICE

CROSS-REFERENCE TO RELATED APPLICATION

This application claims priority from Chinese Application No. 202110423610.2, filed on Apr. 20, 2021, the contents of which are incorporated by reference herein in its entirety

TECHNICAL FIELD

The present disclosure relates to the field of image processing, in particular to a method and an apparatus for controlling a camera, and a medium and an electronic device.

BACKGROUND

With the development of computer technology, Internet-based live teaching begins to emerge, and a panoramic intelligent blackboard combined with multimedia technology also emerged with the live teaching. In the live teaching, a camera is usually used to realize remote Internet-based teaching.

SUMMARY

The content of the summary is provided to introduce inventive concepts in a brief form, and these concepts will be described in detail in following specific embodiments. The content of the summary is not intended to identify key features or essential features of the technical solution that is required to be protected, nor is it intended to be used to limit the scope of the technical solution that is required to be protected.

The purpose of the present disclosure is to provide a method and an apparatus for controlling a camera, and a medium and an electronic device, which can solve at least one technical problem mentioned above. Specific solutions are as follows:

According to specific embodiments of the present disclosure, the present disclosure provides a method for controlling a camera, comprising:

acquiring head portrait information of a teacher in a video frame image of a live classroom in real time;

analyzing the head portrait information to acquire organ identification information of each organ, wherein the organ identification information is used to indicate whether the organ exists;

determining an orientation type of a face in the head portrait information based on the organ identification information, wherein the orientation type comprises a forward type, a lateral type, and a backward type, and the forward type indicates that the face in the head portrait information faces the camera, the lateral type indicates that one side of the face in the head portrait information faces the camera, and the backward type indicates that the face in the head portrait information faces away from the camera;

controlling the camera to focus on the teacher in response to the orientation type being the forward type; and controlling the camera to focus on a blackboard in response to the orientation type being the backward type or the lateral type.

Optionally, the organ identification information comprises at least left eye identification information and right eye identification information;

the determining an orientation type of a face in the head portrait information based on the organ identification information comprises:

determining that the orientation type is the forward type in response to both the left eye identification information and the right eye identification information indicating existence;

determining that the orientation type is the lateral type in response to one of the left eye identification information and the right eye identification information indicating existence;

determining that the orientation type is the backward type in response to both the left eye identification information and the right eye identification information indicating non-existence.

Optionally, the controlling the camera to focus on the teacher in response to the orientation type being the forward type comprises:

controlling a focal length and a shooting angle of the camera to focus on the teacher in response to the orientation type being the forward type, to acquire a first current video frame image, wherein the first current video frame image comprises whole body image information of the teacher, and the whole body image information occupies a first area of the first current video frame image, and the first area is preset.

Optionally, the controlling the camera to focus on a blackboard in response to the orientation type being the lateral type comprises:

controlling a focal length and a shooting angle of the camera to focus on the blackboard in response to the orientation type being the lateral type, to acquire a second current video frame image, wherein the second current video frame image comprises image information of the blackboard and image information of the teacher, and in the second current video frame image, a ratio of a height of the image information of the blackboard to a height of the second current video frame image satisfies a preset height ratio range, and the image information of the teacher is located in a second area associated with the orientation type in the second current video frame image, and the second area is preset.

Optionally, the lateral type comprises a left-side type, and in response to the right eye identification information indicating existence and the left eye identification information indicating non-existence, it is determined that the lateral type is the left-side type;

the controlling a focal length and a shooting angle of the camera to focus on the blackboard in response to the orientation type being the lateral type, to acquire a second current video frame image comprises:

controlling the focal length and the shooting angle of the camera to focus on the blackboard in response to the lateral type being the left-side type, to acquire the second current video frame image, wherein the second current video frame image comprise the image information of the blackboard and the image information of the teacher, and in the second current video frame image, the ratio of the height of the image information of the blackboard to the height of the second current video frame image satisfies the preset height ratio range, and the image information of the teacher is located in the second area on the left side of the second current video frame image.

Optionally, the lateral type comprises a right-side type, and in response to the left eye identification information indicating existence and the right eye identification information indicating non-existence, it is determined that the lateral type is the right-side type;

the controlling a focal length and a shooting angle of the camera to focus on the blackboard in response to the orientation type being the lateral type, to acquire a second current video frame image comprises:

controlling the focal length and the shooting angle of the camera to focus on the blackboard in response to the lateral type being the right-side type, to acquire the second current video frame image, wherein the second current video frame image comprise the image information of the blackboard and the image information of the teacher, and in the second current video frame image, the ratio of the height of the image information of the blackboard to the height of the second current video frame image satisfies the preset height ratio range, and the image information of the teacher is located in the second area on the right side of the second current video frame image.

Optionally, the acquiring head portrait information of a teacher in a video frame image of a live classroom in real time comprises:

acquiring the video frame image of the live classroom through the camera in real time;

judging whether the video frame image comprises the head portrait information of the teacher;

acquiring the head portrait information of the teacher in the video frame image in response to the video frame image comprising the head portrait information of the teacher;

adjusting the camera based on preset camera parameters in response to the video frame image not comprising the head portrait information of the teacher, so that the video frame image comprises overall image information of the blackboard.

According to specific embodiments of the present disclosure, the present disclosure provides a n apparatus for controlling a camera, comprising:

a head portrait acquisition component configured to acquire head portrait information of a teacher in a video frame image of a live classroom in real time;

an analysis component configured to analyze the head portrait information to acquire organ identification information of each organ, wherein the organ identification information is used to indicate whether the organ exists;

a determination component configured to determine an orientation type of a face in the head portrait information based on the organ identification information, wherein the orientation type comprises a forward type, a lateral type, and a backward type, and the forward type indicates that the face is in the head portrait information faces a camera, the lateral type indicates that one side of the face in the head portrait information faces the camera, and the backward type indicates that the face of the head portrait information faces away from the camera; and a focus control component configured to control the camera to focus on the teacher in response to the orientation type being the forward type; and control the camera to focus on a blackboard in response to the orientation type being the backward type or the lateral type.

According to specific embodiments of the present disclosure, the present disclosure provides a computer readable storage medium having a computer program stored thereon, wherein the program is executed by a processor to implement the method according to according the above embodiments.

According to specific embodiments of the present disclosure, the present disclosure provides an electronic device, comprising:

one or more processors;

a storage device configured to store one or more programs, and when the one or more programs are executed by the one or more processors, the one or more processors implement the method according the above embodiments.

Compared with related technologies, the solutions of the embodiments of the present disclosure mentioned above have at least the following beneficial effects:

The present disclosure provides a method and an apparatus for controlling a camera, and a medium and an electronic device. The present disclosure determines an orientation type of the face in the head portrait information through the head portrait information of the teacher in the video frame image, and then determines a focus target of the camera through the orientation type, which enables the live classroom to combine the teaching process to provide corresponding and clear images for students participating in remote live teaching, thus improving teaching experience and ensuring quality of teaching.

BRIEF DESCRIPTION OF THE DRAWINGS

The above and other features, advantages, and aspects of the embodiments of the present disclosure will become more apparent in conjunction with accompanying drawings and with reference to following specific implementations. Throughout the drawings, the same or similar reference number indicates the same or similar elements. It should be understood that the drawings are illustrative, and parts and elements are not necessarily drawn to scale. In the drawings.

REFERENCE SIGNS

Figure 1:
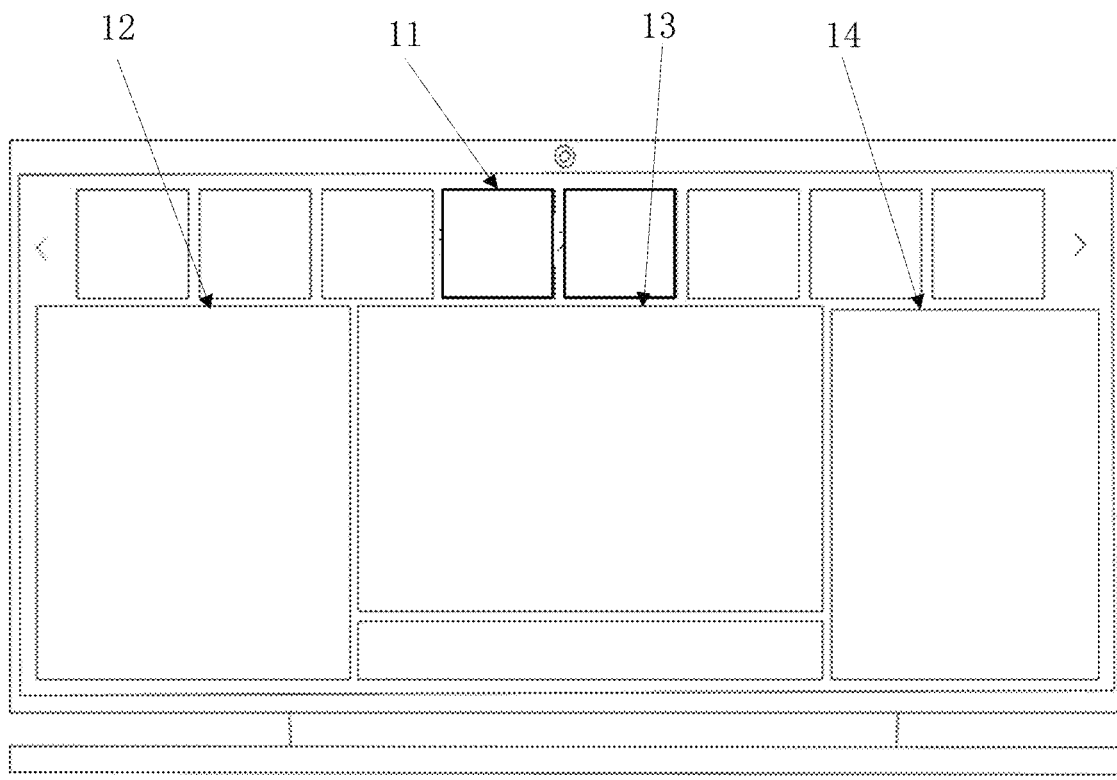
FIG. 1 shows a schematic diagram of a panoramic intelligent blackboard.

11—head portrait display area, 12—image display area, 13—teaching content display area, 14—interaction area; 21—first current video frame image, 22—second current video frame image, 23—first area, 24—second area.

DETAILED DESCRIPTION OF EMBODIMENTS

Hereinafter, embodiments of the present disclosure will be described in more detail with reference to the accompanying drawings. Although some embodiments of the present disclosure are shown in the drawings, it should be understood that the present disclosure can be implemented in various forms, and should not be construed as being limited to the embodiments set forth herein. On the contrary, these embodiments are provided to have a more thorough and complete understanding of the present disclosure. It should be understood that the drawings and embodiments of the present disclosure are only used for exemplary purposes, and are not used to limit the protection scope of the present disclosure.

It should be understood that various steps recorded in method embodiments of the present disclosure may be performed in a different order, and/or performed in parallel. In addition, method implementations may comprise additional steps and/or omit to perform some illustrated steps. The scope of the present disclosure is not limited in this respect.

The term "comprise" and its variants as used herein are open-ended "comprise", that is, "comprise but not limited to". The term "based on" means "based at least in part on". The term "one embodiment" means "at least one embodiment". The term "another embodiment" means "at least one additional embodiment". The term "some embodiments" means "at least some embodiments." Related definitions of other terms will be given in the following description.

It should be noted that concepts of "first" and "second" mentioned in the present disclosure are only used to distinguish different apparatus, modules or units, and are not used to limit an order of functions performed by these apparatus, modules or units, or relationship of interdependence.

It should be noted that modifications by "a" and "a plurality of" mentioned in the present disclosure are illustrative and not restrictive, and those skilled in the art should understand that unless it is otherwise indicated clearly in the context, they should be understood as "one or multiple".

The names of messages or information exchanged between multiple apparatus in the embodiments of the present disclosure are only used for illustrative purposes, and are not used to limit the scope of these messages or information.

Teaching interaction is an important teaching method. That is to say, the educational activity is regarded as a kind of interaction and communication based on teaching content between teachers and students, and between students, and a teaching process is regarded as a dynamic development process, in which teaching and learning are unified and effect and activity interactive. In the teaching process, it is a kind of teaching method to improve the teaching effect by adjusting a relationship between a teacher and a student and interaction thereof to produce teaching interaction.

With the development of computer technology, Internet-based live teaching begins to emerge, and a panoramic intelligent blackboard combined with multimedia technology also emerged with the live teaching. The panoramic intelligent blackboard comprises a plurality of function display areas, and each function display area is used to display the same or different content. For example, as shown in FIG. 1, the left third of the panoramic intelligent blackboard is an image display area 12, the middle is a teaching content display area 13, the right third is an interaction area 14, and an upper part is a head portrait display area 11 of the student, who participates in the live teaching. The entire panoramic intelligent blackboard not only has the function display area, but the entire area of the panoramic intelligent blackboard can be used as a blackboard for writing on its surface. The panoramic intelligent blackboard integrates teaching activities of multiple teachers, which can be displayed on the teacher's side as well as the students participating in such remote teaching. Images of persons in the live classroom and teaching content are closely integrated with each other, which helps participants in the live broadcast teaching to overcome the sense of distance and enhance the sense of presence, and the interest of teaching is increased.

In some embodiments, in the live classroom scene, a camera with a fixed position and fixed camera parameters is used to take a panoramic shot of a main activity space of the teacher. For example, a video frame image comprises the image of the teacher and the image of the whole blackboard. However, the applicant found that an image effect of the video frame image of this camera method is difficult to ensure that both the image of the teacher and the image of fonts in the blackboard are in a clear state. Thus it cannot guarantee that students participating in remote live teaching will get a good teaching experience.

In order to overcome problems mentioned above, the present disclosure provides a method and an apparatus for controlling a camera, and a medium and an electronic device.

Specific embodiments of the present disclosure will be described in detail below with reference to the accompanying drawings.

Some embodiments provided in the present disclosure are embodiments of a method for controlling a camera.

Figure 2:
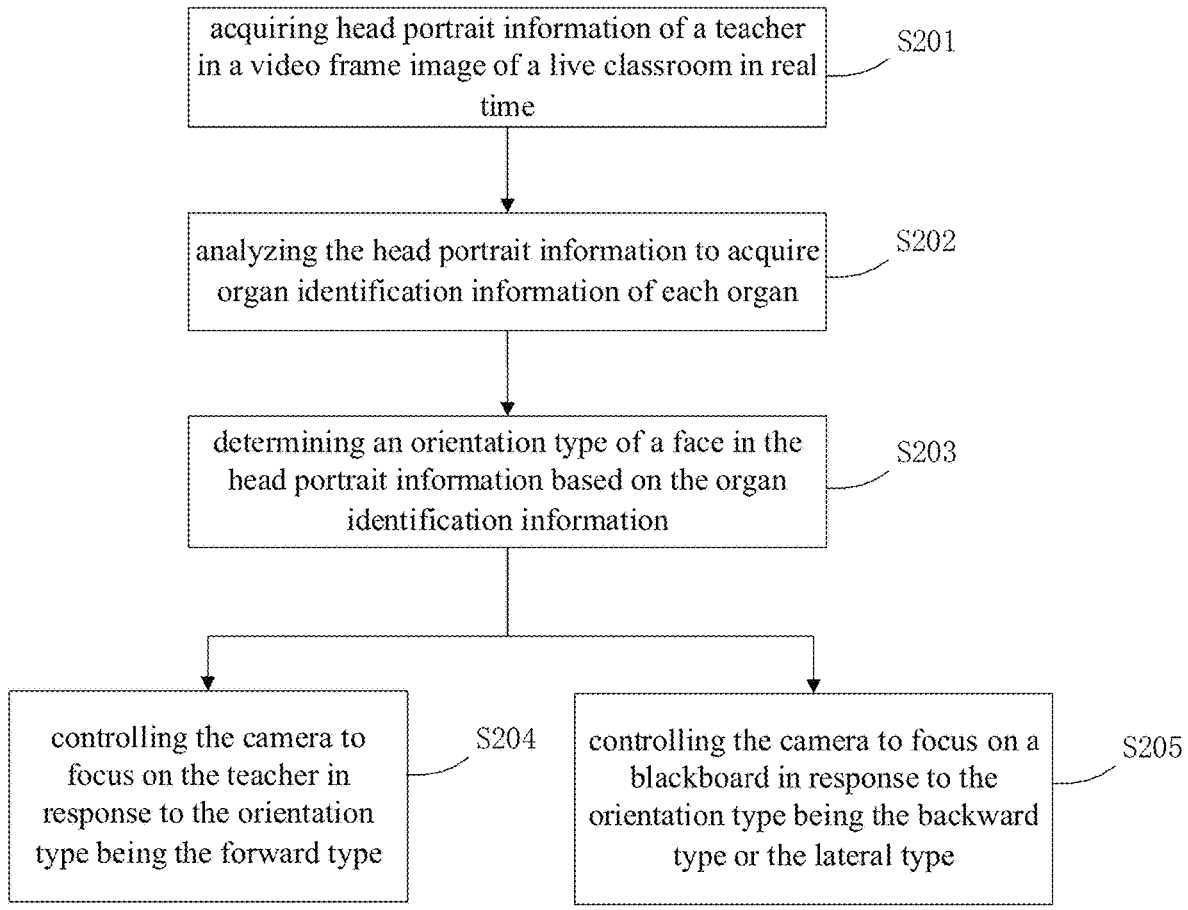
FIG. 2 shows a flowchart of a method for controlling a camera according to embodiments of the present disclosure.

The embodiments of the present disclosure will be described in detail below with reference to FIG. 2.

In the live classroom scene of the embodiment of the present disclosure, a camera is used to photograph the teacher and the blackboard. However, the camera is controllable and may automatically adjust a focus position according to changes of the teaching in the scene.

In step S201, head portrait information of the teacher in the video frame image of the live classroom is acquired in real time.

The video frame image is taken in real time by the camera, and comprises the head portrait information of the teacher.

The head portrait information, that is, the head information in an image of a person, comprises face information, organ information, and back-head information.

The organ information comprises left eye information, right eye information, left eyebrow information, right eyebrow information, left ear information, right ear information, mouth information, and nose information.

In some embodiments, a trained head portrait recognition model can be used to recognize and acquire the head portrait information of the teacher in real time from the video frame image.

The head portrait recognition model can be obtained based on previous historical head portrait information, for example, the head portrait recognition model is trained using the historical head portrait information as a training sample. A process of performing head portrait recognition on historical head portrait information according to the head portrait recognition model is not described in detail in the embodiments, which can be implemented with reference to various implementation manners in related art.

In some embodiments, a Canny operator edge detection method can detect profile information of the teacher's head from the video frame image, and obtain the head portrait information of the teacher through the profile information.

In step S202, the head portrait information is analyzed to acquire organ identification information of each organ.

The organ identification information is used to indicate whether the organ exists. The organ identification information comprises: left eye identification information and right eye identification information, left eyebrow identification information and right eyebrow identification information, left ear identification information and right ear identification information, mouth identification information and nose identification information. For example, the left eye identification information is 1, which means that there is left eye information in the head portrait information; the left eye identification information is 0, which means that there is no left eye information in the head portrait information. Similarly, the right eye identification information is 1, which means that there is right eye information in the head portrait information; the right eye identification information is 0, which means that there is no right eye information in the head portrait information.

The trained organ recognition model can be used to recognize the head portrait information and output the organ identification information.

The organ recognition model can be obtained based on previous historical head portrait information, for example, the organ recognition model is trained using the historical head portrait information as a training sample. A process of performing organ recognition on historical head portrait information according to the organ recognition model is not described in detail in the embodiments, which can be implemented with reference to various implementation manners in related art.

Since the teacher's head is dynamically changing during his teaching, the organ identification information is also changing dynamically.

In step S203, an orientation type of the face in the head portrait information is determined based on the organ identification information.

Herein, the orientation type comprises; a forward type, a lateral type and a backward type.

The forward type indicates that the face in the head portrait information faces the camera, which can be understood as the teacher is teaching and communicating with the students.

The lateral type indicates that the face in the head portrait information neither faces the blackboard nor the camera, which can be understood as, for example, one side of the teacher faces the students, and the other side faces the blackboard. The teacher is teaching the students attending the class based on the content on the blackboard. The backward type indicates that the face in the head portrait information faces away from the camera, which can be understood as the teacher faces away from the students in the class, for example, the teacher faces the blackboard and is writing on the blackboard.

Optionally, the organ identification information comprises at least left eye identification information and right eye identification information.

Figure 2A:
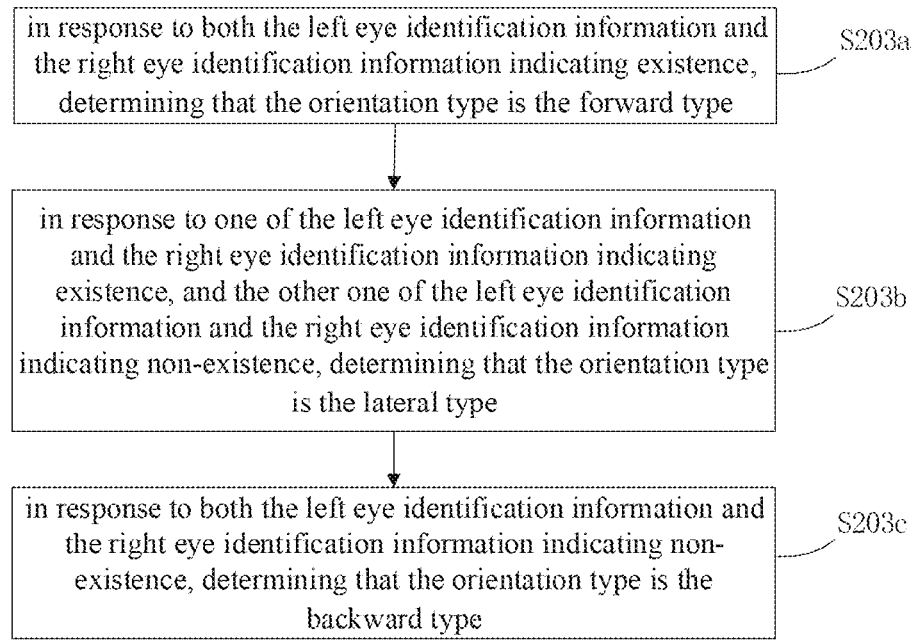
FIG. 2a shows a flowchart of step S203 according to embodiments of the present disclosure.

Correspondingly, as shown in FIG. 2a, determining the orientation type of the face in the head portrait information relative to the camera based on the organ identification information comprises following steps:

In step S203a, in response to both the left eye identification information and the right eye identification information indicating existence, it is determined that the orientation type is the forward type.

Which can be understood as that, if both eyes of a head portrait are displayed in the video frame image, it indicates that the teacher's face faces the camera during his teaching.

The embodiments of the present disclosure select the left eye identification information and the right eye identification information as a basis for determining the orientation type is due to that, the ears are easily covered by hair, the eyebrows are also easily covered by hair or hat, and the eyebrows are located at superciliary arches, which are more prominent in the face and easier to cause misjudgment. In contrast, using the left eye identification information and the right eye identification information as the basis for judging the orientation type can accurately determine the orientation type of the face in the head portrait information.

In step S203b, in response to one of the left eye identification information and the right eye identification information indicating existence, and the other one of the left eye identification information and the right eye identification information indicating non-existence, it is determined that the orientation type is the lateral type.

Further, the lateral type comprises a left-side type and a right-side type.

In response to the right eye identification information indicating existence and the left eye identification information indicating non-existence, it is determined that the orientation type is the left-side type.

In response to the left eye identification information indicating existence and the right eye identification information indicating non-existence, it is determined that the orientation type is the right-side type.

Figure 2B:
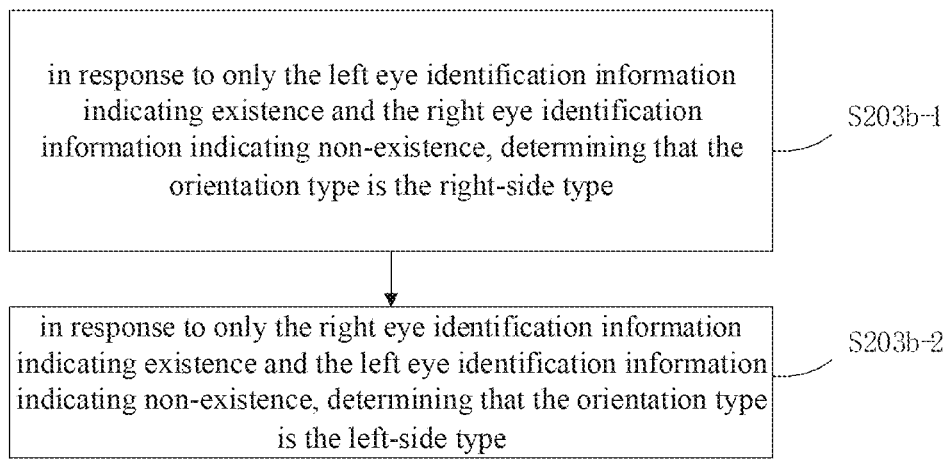
FIG. 2b shows a flowchart of step S203b according to embodiments of the present disclosure.

For example, specifically, as shown in FIG. 2b, for the left eye identification information and the right eye identification information, step S203b further comprises:

In step S203b-1, in response to only the left eye identification information indicating existence and the right eye identification information indicating non-existence, it is determined that the orientation type is the right-side type.

In step S203b-2, in response to only the right eye identification information indicating existence and the left eye identification information indicating non-existence, it is determined that the orientation type is the left-side type.

In step S203c, in response to both the left eye identification information and the right eye identification information indicating non-existence, it is determined that the orientation type is the backward type.

It can be understood that when there is no left eye information and right eye information in the head portrait information, it indicates that the teacher faces away from the camera, for example, the teacher is facing the blackboard.

In step S204, in response to the orientation type being the forward type, the camera is controlled to focus on the teacher.

When the orientation type is the forward type, that is, the teacher faces away from the blackboard and faces the students. At this time, a lecture focus of the teacher is not on the blackboard, so the camera focuses on the teacher. It can be understood as making the image of the teacher clear, and guiding students participating in the live teaching to focus their attention on the teacher, to listen to the content of the lecture by the teacher.

Optionally, in response to the orientation type being the forward type, the camera is controlled to focus on the teacher comprises the following steps:

In response to the orientation type being the forward type, a focal length and a shooting angle of the camera are controlled so that the camera focuses on the teacher to acquire a first current video frame image 21, wherein the first current video frame image 21 comprises whole body image information of the teacher, and the whole body image information occupies a first area 23 of the first current video frame image 21.

Herein, the first area 23 is preset.

Figure 3:
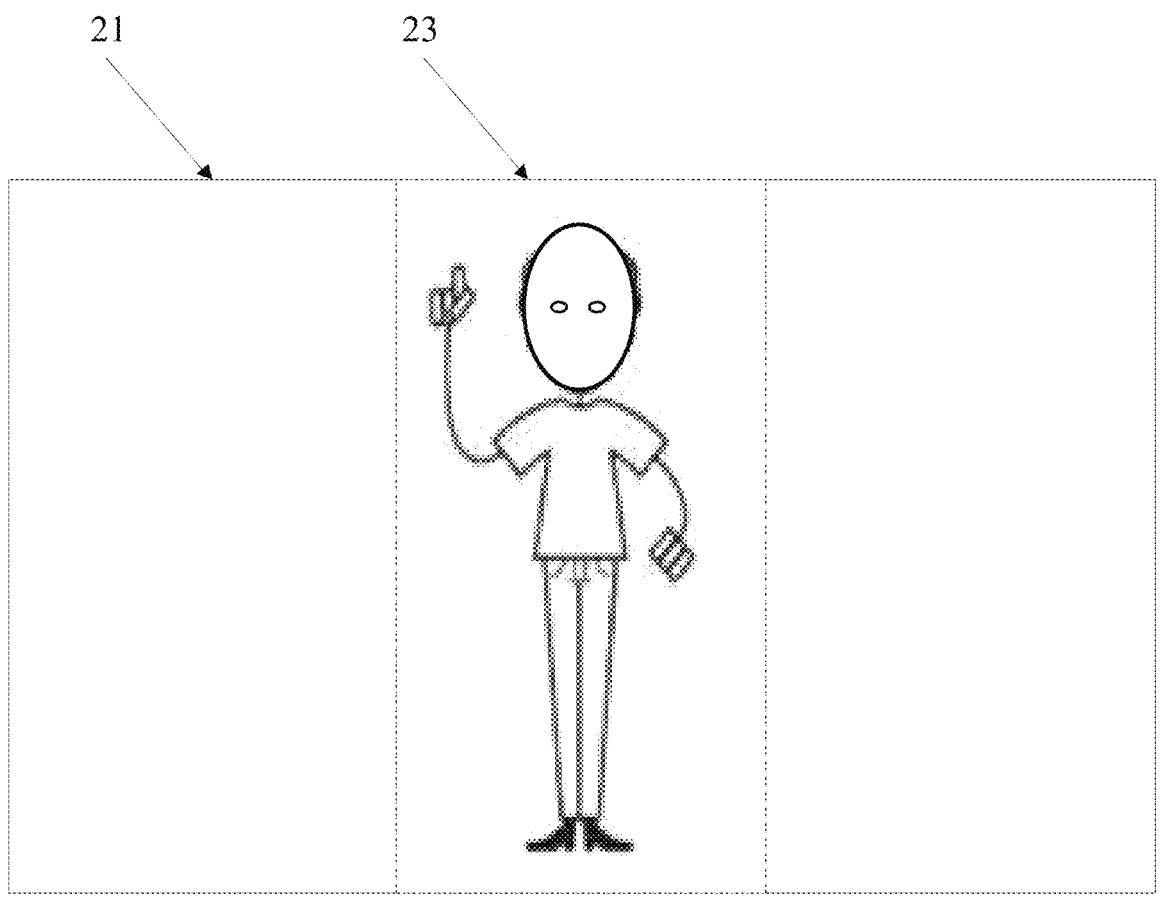
FIG. 3 shows a schematic diagram of a video frame image of a method for controlling a camera according to embodiments of the present disclosure.

For example, as shown in FIG. 3, the first area 23 is located in the middle area of the first current video frame image 21. By adjusting the focal length of the camera, the height of the first area 23 is made to be equal to the height of the first current video frame image 21. The height of the first area 23 mentioned here refers to a length of the first area 23 in the vertical direction in FIG. 3, and the height of the first current video frame image 21 mentioned here refers to a length of the first current video frame image 21 in the vertical direction in FIG. 3, so that the whole body image of the teacher is in the most eye-catching position of the first current video frame image 21, and the camera focuses on the teacher to ensure the clarity of the target.

In step S205, in response to the orientation type being the backward type or the lateral type, the camera is controlled to focus on the blackboard.

When the orientation type is the backward type or the lateral type, it means that the teaching content is related to the blackboard, and therefore, the camera is controlled to focus on the blackboard. It can be understood as making the text on the blackboard clearer. The students participating in the live teaching are guided to focus their attention on the blackboard.

Optionally, in response to the orientation type being the lateral type, the camera is controlled to focus on the blackboard comprises the following steps:

In response to the orientation type being the lateral type, the focal length and the shooting angle of the camera are controlled and focused on the blackboard to acquire a second current video frame image 22, wherein the second current video frame image 22 comprises the image information of the blackboard and the image information of the teacher. In the second current video frame image 22, a ratio of a height of the image information of the blackboard to a height of the second current video frame image 22 satisfies a preset height ratio range. For example, the ratio of the height of the image information of the blackboard to the height of the second current video frame image 22 is greater than or equal to 0.9 and less than or equal to 1. And the image information of the teacher is located in the second area 24 associated with the orientation type in the video frame image. The height of the image information of the blackboard mentioned here refers to the length of the blackboard in the vertical direction in FIG. 4 or FIG. 5, and the height of the second current video frame image 22 mentioned here refers to the length of the second current video frame image 22 in the vertical direction in FIG. 4 or FIG. 5.

The embodiments of the present disclosure not only control the camera to focus on the blackboard, but also combine body posture of the teacher with the content on the blackboard, so as to focus on the corresponding content on the blackboard according to the teacher's actions on the blackboard. For example, the teacher is writing on the blackboard, or the teacher is pointing at the content on the blackboard.

In specific embodiments, the lateral type comprises a left-side type, and in response to the right eye identification information indicating existence and the left eye identification information indicating non-existence, it is determined that the lateral type is the left-side type. That is, there is only right eye information in the head portrait information of the teacher in the video frame image, and there is no left eye information. It can be understood that the teacher is teaching sideways with his right face facing the students. When the teacher is not directly facing the students to teach, the students are desired to shift their attention to the blackboard.

Correspondingly, in response to the orientation type being the lateral type, the focal length and the shooting angle of the camera are controlled and focused on the blackboard to acquire the second current video frame image 22 comprises the following steps:

In response to the lateral type being the left-side type, the focal length and the shooting angle of the camera are controlled, so that the camera focuses on the blackboard to acquire the second current video frame image 22, wherein the second current video frame image 22 comprises the image information of the blackboard and the image information of the teacher. In the second current video frame image 22, a ratio of the height of the image information of the blackboard to the height of the second current video frame image 22 satisfies a preset height ratio range, and the image information of the teacher is located in the second area 24 on the left side of the second current video frame image 22.

Figure 4:
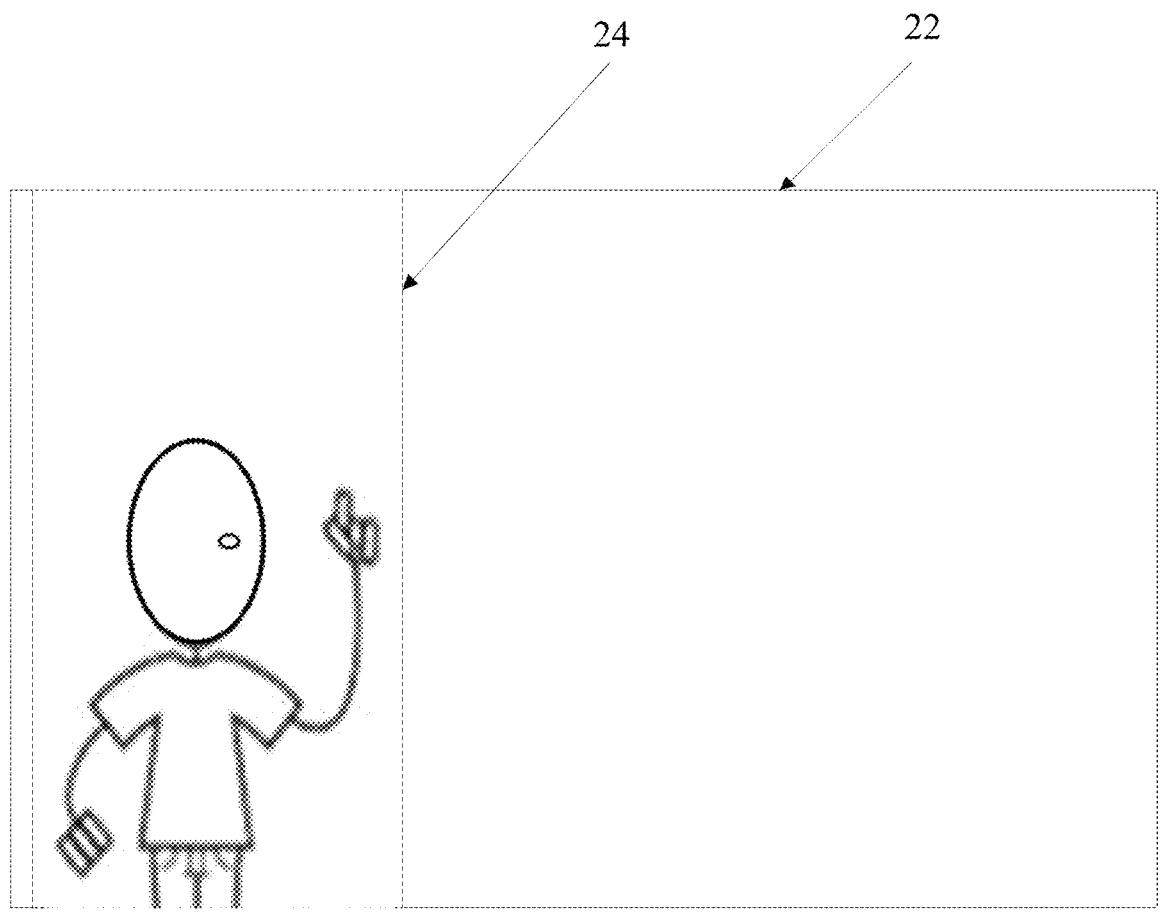
FIG. 4 shows a schematic diagram of another video frame image of a method for controlling a camera according to embodiments of the present disclosure.

For example, as shown in FIG. 4, when the lateral type is the left-side type, it indicates that the teacher is explaining the content on the blackboard. Therefore, in the second current video frame image 22, the ratio of the height of the image information of the blackboard to the height of the second current video frame image 22 satisfies a preset height ratio range, for example, equal to 1. In consideration of normal reading habits, the image information of the teacher is arranged on the left side of the second current video frame image 22. In addition, the camera is controlled to focus on the blackboard, specifically focus on the current content on the blackboard, that is, current board information, so that the students in the class can shift their attention to the content on the blackboard.

In specific embodiments, the lateral type comprises a right-side type, and in response to the left eye identification information indicating existence and the right eye identification information indicating non-existence, it is determined that the lateral type is the right-side type. That is, there is only left eye information in the head portrait information of the teacher in the video frame image, and there is no right eye information. It can be understood that the teacher is teaching sideways with his left face facing the students. When the teacher is not directly facing the students to teach, the students are desired to shift their attention.

Correspondingly, in response to the orientation type being the lateral type, the focal length and the shooting angle of the camera are controlled so that the camera focuses on the blackboard to acquire the second current video frame image 22 comprises the following steps:

In response to the lateral type being the right-side type, the focal length and the shooting angle of the camera are controlled so that the camera focuses on the blackboard to acquire the second current video frame image 22, wherein the second current video frame image 22 comprises the image information of the blackboard and the image information of the teacher. In the second current video frame image 22, a ratio of the height of the image information of the blackboard to the height of the second current video frame image 22 satisfies a preset height ratio range, and the image information of the teacher is located in the second area 24 on the right side of the second current video frame image 22.

Figure 5:
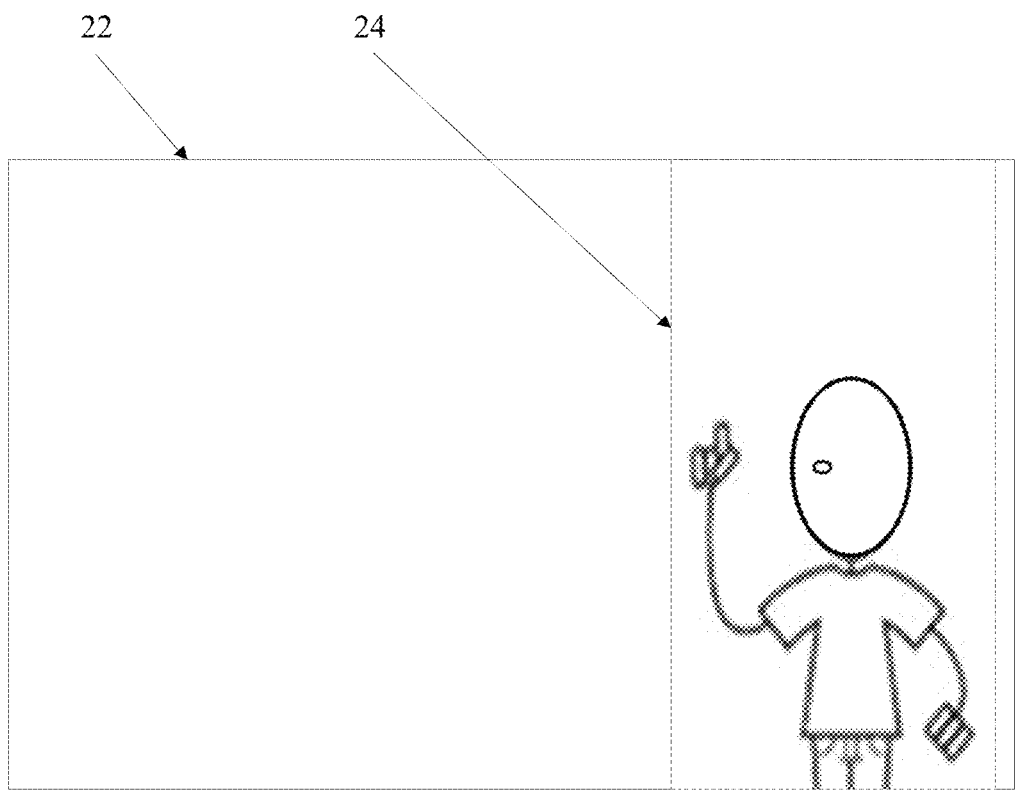
FIG. 5 shows a schematic diagram of another video frame image of a method for controlling a camera according to embodiments of the present disclosure.

For example, as shown in FIG. 5, when the lateral type is the right-side type, it indicates that the teacher is explaining the content on the blackboard. Therefore, in the second current video frame image 22, the ratio of the height of the image information of the blackboard to the height of the second current video frame image 22 satisfies a preset height ratio range, for example, equal to 1. In consideration of normal reading habits, the image information of the teacher is arranged on the right side of the second current video frame image 22. In addition, the camera is controlled to focus on the blackboard, specifically focus on the current content on the blackboard, that is, the current board information, so that the students in the class can shift their attention to the content on the blackboard.

When the orientation type is the backward type, it indicates that the teacher is writing the lecture content on the blackboard. In response to the orientation type being the backward type, the focal length and the shooting angle of the camera are controlled, so that the camera focuses on the teacher to acquire a third current video frame image. Therefore, in the third current video frame image, a ratio of the height of the image information of the blackboard to the height of the third current video frame image satisfies a preset height ratio range, for example, equal to 1. Since normal writing habits are from left to right, the image information of the teacher is arranged on the right side of the third current video frame image. In addition, the camera is controlled to focus on the blackboard on the left side of the teacher, so that the students in the lecture can shift their attention to the content on the blackboard.

Figure 2C:
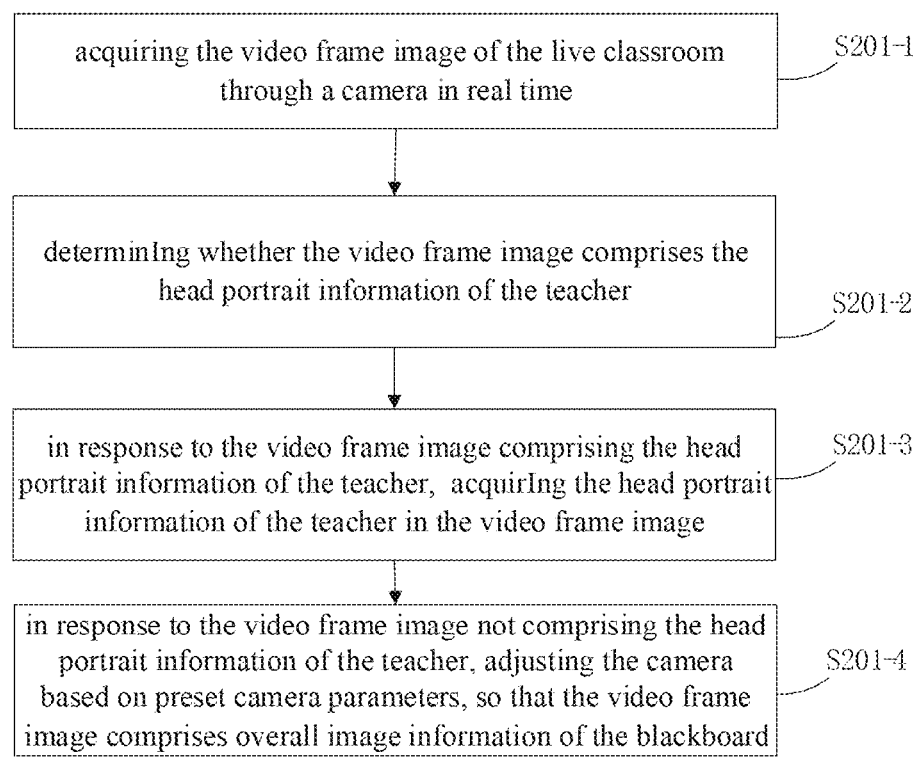
FIG. 2c shows a flowchart of step S201 according to embodiments of the present disclosure.

The present disclosure is based on tracking the teacher's head portrait information as the basis for focusing. However, in the process of tracking the teacher's head portrait information, it may happen that the teacher's head portrait information is not in the video frame image. For example, the teacher has not yet entered the live classroom, or the tracked head portrait information is missing. In order to avoid that the teacher is not in the video frame image of the camera and cannot be focused on, optionally, as shown in FIG. 2c, acquiring the head portrait information of the teacher in the video frame image of the live classroom comprises the following steps:

In step S201-1, the video frame image of the live classroom is acquired through a camera in real time.

In step S201-2, whether the video frame image comprises the head portrait information of the teacher is determined.

The head portrait information of the teacher can be recognized from the video frame image by using the trained head portrait recognition model.

In step S201-3, in response to the video frame image comprising the head portrait information of the teacher, the head portrait information of the teacher in the video frame image is acquired.

It indicates that the video frame image comprises the head portrait information of the teacher, so that the head portrait information of the teacher can be acquired, thus the steps mentioned before can be performed to focus on the target object.

In step S201-4, in response to the video frame image not comprising the head portrait information of the teacher, the camera is adjusted based on preset camera parameters, so that the video frame image comprises overall image information of the blackboard.

Specifically, if the head portrait information of the teacher is not comprised in the video frame image, it indicates that the target is lost during the target tracking process; or the target has not yet entered the tracking range of the camera, for example, before the class starts.

The preset camera parameters comprise: focal length information, shooting angle information, and focus information of the camera. The purpose of preset camera parameters is to make the video frame image comprise the panoramic image information of the blackboard, thereby expanding a shooting range of the camera and improving a range of tracking the target.

In the embodiments of the present disclosure, the orientation type of the face in the head portrait information is determined through the head portrait information of the teacher in the video frame image, and then the focus target of the camera is determined through the orientation type, which enable the live classroom to combine the teaching process to provide corresponding and clear images for students participating in remote such live teaching, thus improving teaching experiences and ensuring the quality of teaching.

Corresponding to foregoing embodiments provided in the present disclosure, the present disclosure also provides some embodiments, namely, an apparatus for controlling a camera. Since these embodiments are basically similar to the foregoing embodiments, the description is relatively simple. For related parts, please refer to the corresponding descriptions of the foregoing embodiments. Apparatus embodiments described below are merely illustrative.

Figure 6:
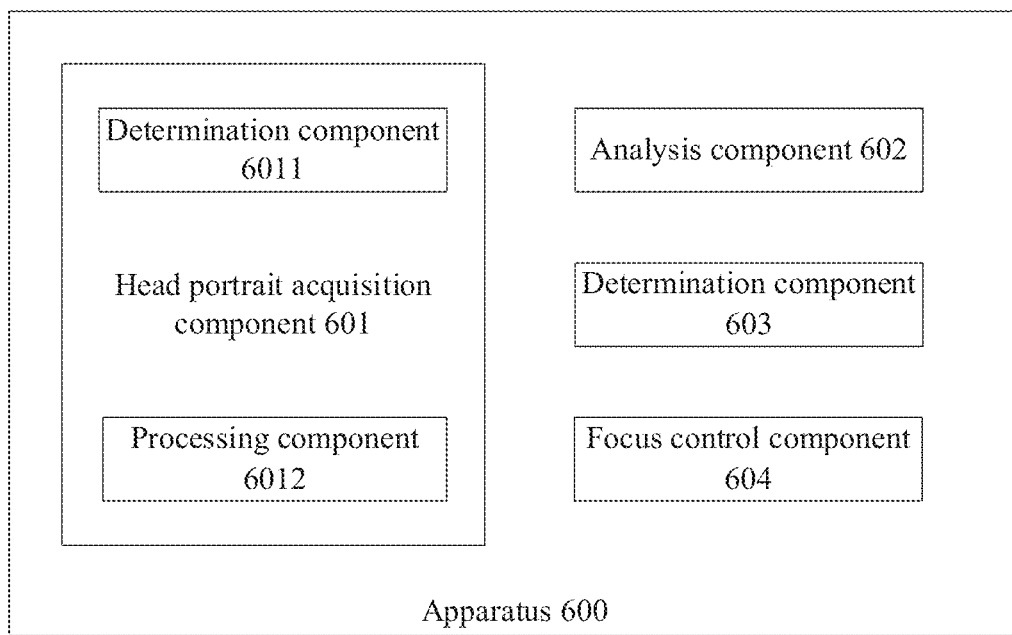
FIG. 6 shows a structural block diagram of an apparatus for controlling a camera according to embodiments of the present disclosure.

FIG. 6 shows embodiments of an apparatus for controlling a camera provided by the present disclosure.

As shown in FIG. 6, the present disclosure provides an apparatus 600 for controlling a camera, comprising:

an head portrait acquisition component 601 configured to acquire head portrait information of the teacher in the video frame image of the live classroom in real time;

an analysis component 602 configured to analyze the head portrait information to acquire organ identification information of each organ, where the organ identification information is used to indicate whether the organ exists;

a determination component 603 configured to determine the orientation type of the face in the head portrait information based on the organ identification information, where the forward type indicates that the face in the head portrait information faces the camera, and the lateral type indicates the One side of the face in the head portrait information faces the camera, and the backward type indicates that the face of the head portrait information faces away from the camera; and a focus control component 604 configured to control the camera to focus on the teacher in response to the orientation type being a forward type; and configured to control the camera to focus on the blackboard in response to the orientation type being a backward type or a lateral.

Optionally, the organ identification information comprises at least left eye identification information and right eye identification information.

Correspondingly, the determination component 603 is configured to:

in response to both the left eye identification information and the right eye identification information indicating existence, determine that the orientation type is a forward type;

in response to one of the left eye identification information and the right eye identification information indicating existence, determine that the orientation type is a lateral type;

in response to both the left eye identification information and the right eye identification information indicating non-existence, determine that the orientation type is a backward type.

Optionally, the focus control component 604 is configured to:

in response to the orientation type being the forward type, control the focal length and the shooting angle of the camera to focus on the teacher to acquire a first current video frame image, wherein the first current video frame image comprises whole body image information of the teacher, and the whole body image information occupies a first area of the first current video frame image, and the first area is preset; and in response to the orientation type being the lateral type, control the focal length and the shooting angle of the camera to focus on the blackboard to acquire a second current video frame image, wherein the second current video frame image comprises image information of the blackboard and image information of the teacher, and in the second current video frame image, a ratio of the height of the image information of the blackboard to the height of the second current video frame image satisfies a preset height ratio range, and the image information of the teacher is located in a second area associated with the orientation type in the second current video frame image, and the second area is preset.

Optionally, the lateral type comprises a left-side type, and in response to the right eye identification information indicating existence and the left eye identification information indicating non-existence, it is determined that the lateral type is the left-side type.

Correspondingly, the focus control component 604 is configured to:

in response to the lateral type being the left-side type, control the focal length and the shooting angle of the camera to focus on the blackboard to acquire the second current video frame image, wherein the second current video frame image comprises the image information of the blackboard and the image information of the teacher, and in the second current video frame image, the ratio of the height of the image information of the blackboard to the height of the second current video frame image satisfies a preset height ratio range, and the image information of the teacher is located in the second area on the left side of the second current video frame image.

Optionally, the lateral type comprises a right-side type, and in response to the left eye identification information indicating existence and the right eye identification information indicating non-existence, it is determined that the lateral type is the right-side type.

Correspondingly, the focus control component 604 is configured to:

In response to the lateral type being the right-side type, control the focal length and the shooting angle of the camera to focus on the blackboard to acquire the second current video frame image, wherein the second current video frame image comprises the image information of the blackboard and the image information of the teacher, and in the second current video frame image, a ratio of the height of the image information of the blackboard to the height of the second current video frame image satisfies a preset height ratio range, and the image information of the teacher is located in the second area on the right side of the second current video frame image.

Optionally, as shown in FIG. 6, the head portrait acquisition component 601 of the camera further comprises a determination component 6011 and a processing component 6012.

The video frame image of the live classroom is acquired through a camera in real time; the determination component 6011 is configured to determine whether the video frame image comprises the head portrait information of the teacher.

In response to the video frame image comprising the head portrait information of the teacher, the processing component 6012 acquires the head portrait information of the teacher in the video frame image.

In response to the video frame image not comprising the head portrait information of the teacher, the processing component 6012 is configured to adjust the camera based on preset camera parameters, so that the video frame image comprises overall image information of the blackboard.

The embodiments of the present disclosure determine the orientation type in the head portrait information based on the head portrait information of the teacher in the video frame image, and then determine the focus target of the camera through the orientation type, which enable the live classroom to combine the teaching process to provide corresponding and clear images for students participating in remote live teaching, thus improving teaching experience and ensuring quality of teaching.

Some embodiments of the present disclosure provide an electronic device used in the method for controlling a camera. The electronic device comprises at least one processor and a memory communicatively connected with the at least one processor.

Herein, the memory stores instructions executable by the one processor, and the instructions are executed by the at least one processor, so that the at least one processor can execute the method for controlling a camera described in the foregoing embodiments.

The embodiments of the present disclosure provide computer readable storage medium used in controlling a camera, the computer readable storage medium stores computer executable instructions, and the computer executable instructions can execute the method for controlling a camera described in the foregoing embodiments.

Figure 7:
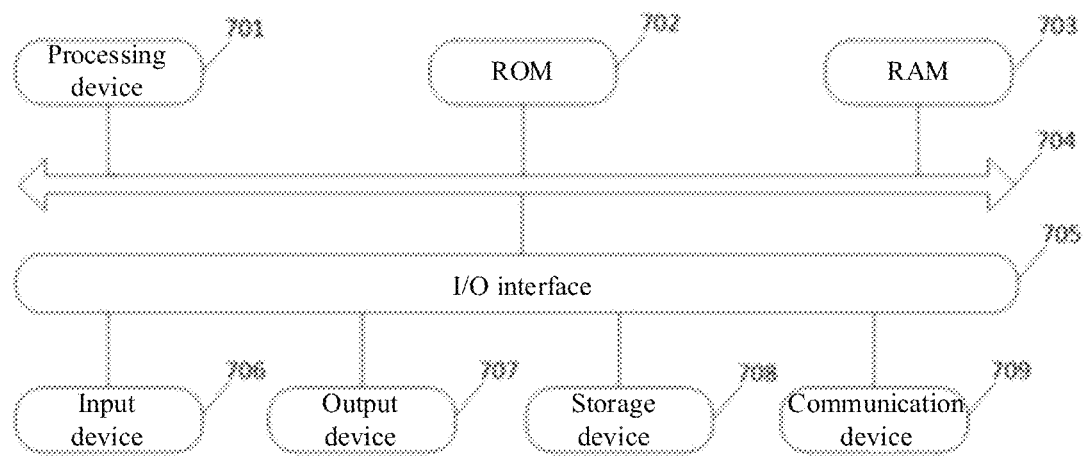
FIG. 7 shows a schematic diagram of a connection structure of an electronic device according to embodiments of the present disclosure.

Referring to FIG. 7, it shows a schematic structural diagram of an electronic device suitable for implementing the embodiments of the present disclosure. The terminal device in the embodiments of the present disclosure may comprise, but are not limited to, mobile phones, notebook computers, digital broadcast receivers, PDAs (personal digital assistants), PADs (tablet computers), PMPs (portable multimedia players), vehicle-mounted terminals (such as vehicle-mounted navigation terminals) and other mobile terminals and fixed terminals such as digital TVs, desktop computers, etc. The electronic device shown in FIG. 7 is only an example, and should not bring any limitation to the function and scope of use of the embodiments of the present disclosure.

As shown in FIG. 7, the electronic device may comprise a processing device (such as a central processing unit, a graphics processor, etc.) 701, which may perform various appropriate actions and processing according to programs stored in a read-only memory (ROM) 702 or programs loaded from a storage device 708 into a random access memory (RAM) 703. In the RAM 703, various programs and data required for the operation of the electronic device are also stored. The processing device 701, the ROM 702, and the RANI 703 are connected to each other through a bus 704. An input/output (I/O) interface 705 is also connected to the bus 704.

Generally, the following devices can be connected to the I/O interface 705: comprising an input device 706 such as a touch screen, a touch pad, a keyboard, a mouse, a camera, a microphone, an accelerometer, a gyroscope, etc., an output device 707 such as a liquid crystal display (LCD), a speaker, a vibration, etc., a storage device 708 such as a magnetic tape, a hard disk, etc., and a communication device 709 which may allow the electronic device to perform wireless or wired communication with other devices to exchange data. Although FIG. 7 shows an electronic device with various devices, it should be understood that it is not required to implement or have all of the illustrated devices. It may alternatively be implemented or provided with more or fewer devices.

In particular, according to embodiments of the present disclosure, the process described above with reference to the flowchart can be implemented as a computer software program. For example, embodiments of the present disclosure comprise a computer program product, which comprises computer programs carried on a non-transitory computer readable medium, and the computer programs contain program codes for executing the method shown in the flowchart. In such embodiments, the computer programs may be downloaded and installed from the network through the communication device 709, or installed from the storage device 708, or installed from the ROM 702. When the computer program is executed by the processing device 701, it executes the above-mentioned functions defined in the method of the embodiment of the present disclosure.

It should be noted that the computer readable medium mentioned above in the present disclosure may be a computer readable signal medium or a computer readable storage medium, or any combination of the two. The computer readable storage medium may be, for example, but not limited to, electrical, a magnetic, optical, electromagnetic, infrared, or semiconductor system, apparatus, or device, or a combination of any of the above. More specific examples of computer readable storage media may comprise, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that contains or stores a program, and the program may be used by or in combination with an instruction execution system, apparatus, or device. In the present disclosure, a computer readable signal medium may comprise a data signal propagated in a baseband or as a part of a carrier wave, and a computer readable program code is carried therein. This propagated data signal can take many forms, comprising but not limited to electromagnetic signals, optical signals, or any suitable combination of the above. The computer readable signal medium may also be any computer readable medium other than the computer readable storage medium. The computer readable signal medium may send, propagate, or transmit the program for use by or in combination with the instruction execution system, apparatus, or device. The program code carried on the computer readable medium can be transmitted by any suitable medium, comprising but not limited to wire, optical cable, RF (Radio Frequency), etc., or any suitable combination of the above.

In some embodiments, a client and a server can communicate with any currently known or future-developed network protocol such as HTTP (Hyper Text Transfer Protocol), and can communicate and connect with digital data in any form or medium (for example, communication network). Examples of communication networks comprise local area networks ("LAN"), wide area networks ("WAN"), networks of network (for example, the Internet), and end-to-end networks (for example, ad hoc end-to-end networks), as well as any currently known or future-developed network.

The computer readable medium mentioned above may be comprised in the electronic device mentioned above, or it may exist alone without being assembled into the electronic device.

The computer program code for performing the operations of the present disclosure can be written in one or more programming languages or a combination thereof. The programming languages mentioned above comprise but are not limited to object-oriented programming languages such as Java, Smalltalk, C++, and also comprising conventional procedural programming languages such as "C" language or similar programming languages. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, comprising a local area network (LAN) or a wide area network (WAN), or it can be connected to an external computer (for example, using an Internet service provider and connecting through the Internet).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units involved in the embodiments described in the present disclosure may be implemented in a software manner, and may also be implemented in a hardware manner. Among them, the name of the unit does not constitute a limitation on the unit itself under certain circumstances.

The functions described hereinabove may be performed at least in part by one or more hardware logic components. For example, without limitation, exemplary types of hardware logic components that can be used comprise, Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine readable medium may be a tangible medium, which may contain or store a program for use by the instruction execution system, apparatus, or device or in combination with the instruction execution system, apparatus, or device. The machine readable medium may be a machine readable signal medium or a machine readable storage medium. The machine readable medium may comprise, but is not limited to, an electronic, magnetic, optical, electromagnetic, infrared, or semiconductor system, apparatus, or device, or any suitable combination of the foregoing. More specific examples of machine readable storage media would comprise electrical connections based on one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

The above description is only a preferred embodiment of the present disclosure and an explanation of technical principles applied. Those skilled in the art should understand that the scope of disclosure involved in this disclosure is not limited to the technical solutions formed by the specific combination of the above technical features, and should also cover the above technical features or technical solutions without departing from the above disclosed concept. Other technical solutions formed by arbitrarily combining the equivalent features. For example, the features mentioned above and the technical features disclosed in the present disclosure (but not limited to) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for controlling a camera, comprising:
   acquiring head portrait information of a teacher in a video frame image of a live classroom in real time;
   analyzing the head portrait information to acquire organ identification information of each organ, wherein the organ identification information is used to indicate whether the organ exists;
   determining an orientation type of a face in the head portrait information based on the organ identification information, wherein the orientation type comprises a forward type, a lateral type, and a backward type, and the forward type indicates that the face in the head portrait information faces the camera, the lateral type indicates that one side of the face in the head portrait information faces the camera, and the backward type indicates that the face in the head portrait information faces away from the camera;
   controlling the camera to focus on the teacher in response to the orientation type being the forward type; and
   controlling the camera to focus on a blackboard in response to the orientation type being the backward type or the lateral type.

2. The method of claim 1, wherein the organ identification information comprises at least left eye identification information and right eye identification information;
   the determining an orientation type of a face in the head portrait information based on the organ identification information comprises:
   determining that the orientation type is the forward type in response to both the left eye identification information and the right eye identification information indicating existence;
   determining that the orientation type is the lateral type in response to one of the left eye identification information and the right eye identification information indicating existence;
   determining that the orientation type is the backward type in response to both the left eye identification information and the right eye identification information indicating non-existence.

3. The method of claim 1, wherein the controlling the camera to focus on the teacher in response to the orientation type being the forward type comprises:
   controlling a focal length and a shooting angle of the camera to focus on the teacher in response to the orientation type being the forward type, to acquire a first current video frame image, wherein the first current video frame image comprises whole body image information of the teacher, and the whole body image information occupies a first area of the first current video frame image, and the first area is preset.

4. The method of claim 2, wherein the controlling the camera to focus on a blackboard in response to the orientation type being the lateral type comprises:
   controlling a focal length and a shooting angle of the camera to focus on the blackboard in response to the orientation type being the lateral type, to acquire a second current video frame image, wherein the second current video frame image comprises image information of the blackboard and image information of the teacher, and in the second current video frame image, a ratio of a height of the image information of the blackboard to a height of the second current video frame image satisfies a preset height ratio range, and the image information of the teacher is located in a second area associated with the orientation type in the second current video frame image, and the second area is preset.

5. The method of claim 4, wherein the lateral type comprises a left-side type, and in response to the right eye identification information indicating existence and the left eye identification information indicating non-existence, it is determined that the lateral type is the left-side type;
   the controlling a focal length and a shooting angle of the camera to focus on the blackboard in response to the orientation type being the lateral type, to acquire a second current video frame image comprises:
   controlling the focal length and the shooting angle of the camera to focus on the blackboard in response to the lateral type being the left-side type, to acquire the second current video frame image, wherein the second current video frame image comprise the image information of the blackboard and the image information of the teacher, and in the second current video frame image, the ratio of the height of the image information of the blackboard to the height of the second current video frame image satisfies the preset height ratio range, and the image information of the teacher is located in the second area on the left side of the second current video frame image.

6. The method of claim 4, wherein the lateral type comprises a right-side type, and in response to the left eye identification information indicating existence and the right eye identification information indicating non-existence, it is determined that the lateral type is the right-side type;

the controlling a focal length and a shooting angle of the camera to focus on the blackboard in response to the orientation type being the lateral type, to acquire a second current video frame image comprises:

controlling the focal length and the shooting angle of the camera to focus on the blackboard in response to the lateral type being the right-side type, to acquire the second current video frame image, wherein the second current video frame image comprise the image information of the blackboard and the image information of the teacher, and in the second current video frame image, the ratio of the height of the image information of the blackboard to the height of the second current video frame image satisfies the preset height ratio range, and the image information of the teacher is located in the second area on the right side of the second current video frame image.

7. The method of claim 1, wherein the acquiring head portrait information of a teacher in a video frame image of a live classroom in real time comprises:

acquiring the video frame image of the live classroom through the camera in real time;

judging whether the video frame image comprises the head portrait information of the teacher;

acquiring the head portrait information of the teacher in the video frame image in response to the video frame image comprising the head portrait information of the teacher;

adjusting the camera based on preset camera parameters in response to the video frame image not comprising the head portrait information of the teacher, so that the video frame image comprises overall image information of the blackboard.

8. An apparatus for controlling a camera, comprising:

a head portrait acquisition component configured to acquire head portrait information of a teacher in a video frame image of a live classroom in real time;

an analysis component configured to analyze the head portrait information to acquire organ identification information of each organ, wherein the organ identification information is used to indicate whether the organ exists;

a determination component configured to determine an orientation type of a face in the head portrait information based on the organ identification information, wherein the orientation type comprises a forward type, a lateral type, and a backward type, and the forward type indicates that the face is in the head portrait information faces a camera, the lateral type indicates that one side of the face in the head portrait information faces the camera, and the backward type indicates that the face of the head portrait information faces away from the camera; and a focus control component configured to control the camera to focus on the teacher in response to the orientation type being the forward type; and control the camera to focus on a blackboard in response to the orientation type being the backward type or the lateral type.

9. A non-transitory computer readable storage medium having a computer program stored thereon, wherein the program is executed by a processor to implement the method according to claim 1.

10. An electronic device, comprising:

one or more processors;

a storage device configured to store one or more programs, and when the one or more programs are executed by the one or more processors, the one or more processors implement the method according to claim 1.

* * * * *